United States Patent
Sohda et al.

(10) Patent No.: US 7,512,691 B2
(45) Date of Patent: Mar. 31, 2009

(54) MESSAGE REQUEST RESPONSE SERVER AND PROCESSOR

(75) Inventors: Yukihiko Sohda, Yamato (JP); Toshiro Takase, Yamato (JP); Yuhichi Nakamura, Yokohama (JP); Michiaki Tatsubori, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 11/058,510

(22) Filed: Feb. 15, 2005

(65) Prior Publication Data

US 2006/0075117 A1  Apr. 6, 2006

(30) Foreign Application Priority Data

Feb. 17, 2004  (JP) .............................. 2004-040202

(51) Int. Cl.
    *G06F 15/16*  (2006.01)
(52) U.S. Cl. .................... 709/227; 709/217; 709/219
(58) Field of Classification Search ................ 709/217, 709/219, 227
    See application file for complete search history.

(56) References Cited

U.S. PATENT DOCUMENTS 7,093,073 B2 *  8/2006  Truty .......................... 711/118

FOREIGN PATENT DOCUMENTS

| JP | 2003-203067 | 7/2003 |
| JP | 2003-271441 | 9/2003 |

OTHER PUBLICATIONS

Brian D. Goodman, "Accelerate your Web services with caching", [online], Dec. 1, 2002, International Business Machines, [retrieved on Jan. 27, 2004 from the Internet].
Bob Atkinson et al., "Web Services Security (WS-Security)", [online], May 23, 2002, International Business Machines, [retrieved on Jan. 27, 2004 from the Internet].
JP920040004US1-Reference-AccelerateyourWeb-69605655.
JP920040004US1-Reference2-64255855.
JP920040004US1-Reference-SoapforJava-17950425.
JP920040004US1-Reference-SoapforJavaEng-23393328.
JP920040004US1-Reference-WebServiceClients-75560591.
JP920040004US1-Reference-WebServiceCopingbyCaching-41112308.
JP920040004US1-Reference-WebServicesSecurity--92022673.
JP920040004US1-Reference1-27167863.

* cited by examiner

*Primary Examiner*—Jeffrey Pwu
*Assistant Examiner*—Farhad Ali
(74) *Attorney, Agent, or Firm*—Vazken Alexanian

(57) ABSTRACT

Provides methods, apparatus and systems for message request response server and processor. A server apparatus including: a request processing unit for performing processing for a first processing request message received, and creating a first processing response message; a cache unit for caching the first processing response message in association with a first key created based on the first processing request message; a message analysis unit for analyzing the second processing request message received; a key creation unit for creating a second key based on the analysis result; and a cache management unit for returning the cached first processing response message when the second key coincides with the first key, and when the second key does not coincide with the first key, notifying the result of the analysis, allowing the request processing unit to perform processing based on the analysis result, and returning the second processing response message created.

1 Claim, 9 Drawing Sheets

```
class reg {
      string element 1;

:
              :

string element n;
}
```

FIG.6

```
class reg {
      string element o1;

:
              :

string element on;
}
```

MESSAGE REQUEST RESPONSE SERVER AND PROCESSOR

FIELD OF THE INVENTION

The present invention relates to a server apparatus, a service method, a program and a recording medium. Particularly, the present invention relates to a server apparatus, a service method, a program and a recording medium, for each of a plurality of elements, for receiving a processing request message including a structured document in which a name of the element and a content thereof are described, performing processing based on the processing request message, and returning a processing response message.

BACKGROUND OF THE INVENTION

Heretofore, there has been provided a Web service system, which provides a service by a server apparatus connected to a network, and combines a variety of Web services on a client apparatus, thus making it possible to construct software. In the Web service system, the client apparatus transmits, to the server apparatus, a SOAP (Simple Object Access Protocol) request message including an XML (Extensible Markup Language) document describing arguments to be given to the Web services, and requests processing for the Web services. Upon receiving the SOAP request message, the server apparatus performs the processing for the Web services, and returns, to the client apparatus, a SOAP response message including an XML document describing return values of the Web services. According to the Web service system, the variety of web services provided by service providers on an Internet are combined, thus making it possible to develop the software efficiently. Moreover, a distributed system in which information systems of a plurality of enterprises are associated with one another can be constructed.

A general server apparatus which provides the Web services includes a streaming syntax analyzer which performs an analysis of syntax of the SOAP request message, and a request processing unit which performs the processing for the Web services based on a result of the syntax analysis. Then, the request processing unit includes a message conversion unit which creates an input object such as a Java object including parameters to be given to the Web services based on the result of the syntax analysis and converts an output object such as a Java object including the return values of the Web services into the SOAP response message, and an application processing unit which performs processing for a server application based on the input object received from the message conversion unit and returns a result of the processing as the output object to the message conversion unit.

The following documents are considered:
- [Patent Document 1] Japanese Patent Laid-Open Publication No. 2003-271441
- [Non-Patent Document 1] Brian D. Goodman, "Accelerate your web services with caching," [online], Dec. 1, 2002, International Business Machines, [retrieved on Jan. 27, 2004 from the Internet]
- [Non-Patent Document 2] Bob Atkinson et al., "Web Services Security (WS-Security)," [online], May 23, 2002, International Business Machines, [retrieved on Jan. 27, 2004 from the Internet]

In order to reduce response time of the above-described server apparatus, caching technologies shown in Patent Document 1 and Non-Patent Document 1 are disclosed.

Patent Document 1 discloses a server apparatus having a cache mechanism provided in front of the streaming syntax analyzer in the above-described general server apparatus. In this server apparatus, the cache mechanism first analyzes a SOAP request message received and determines whether or not a corresponding SOAP response message is cashed. Thereafter, if the corresponding SOAP response message is cached, the cache mechanism returns the cached SOAP response message. Meanwhile, if the corresponding SOAP response message is not cached, the cache mechanism sends the SOAP request message to the streaming syntax analyzer and allows the streaming syntax analyzer and a server application processing unit to perform processing.

Non-Patent Document 1 discloses a method for providing a cache mechanism between the message conversion unit and the application processing unit in the request processing unit in the above-described general server apparatus. In this method, the streaming syntax analyzer analyzes a SOAP request message received, and the message conversion unit creates an input object based on a result of the syntax analysis. Next, the cache mechanism determines whether or not an output object corresponding to the input object is cached. Thereafter, if the corresponding output object is cached, the cache mechanism allows the message conversion unit to convert the cached output object into a SOAP response message and to return the message. Meanwhile, if the corresponding output object is not cached, the cache mechanism sends the input object to the server application processing unit to perform processing for Web services.

In the cache method of Patent Document 1, the cache mechanism is provided before the processing of the streaming syntax analyzer and after. Accordingly, there is an advantage that response time at the time of a cache hit is shorter as compared with that of Non-Patent Document 1. Meanwhile, the cache mechanism analyzes the SOAP request message to some extent for the purpose of determining whether the cache is hit or missed. When the cache is missed, the cache mechanism sends the SOAP request message to the request processing unit. Accordingly, the analysis in the cache mechanism becomes useless, and the response time is increased.

In the cache method of Non-Patent Document 2, the cache mechanism caches output objects corresponding to input objects created by the streaming syntax analyzer and the message conversion unit. Therefore, it is not necessary to analyze the SOAP request message only for the purpose of determining whether the cache is hit or missed, thus making it possible to control an increase of the response time when the cache is missed. Meanwhile, it is necessary to create the input objects also when the cache is hit, and accordingly, the response time becomes longer as compared with that of the cache method of Patent Document 1.

SUMMARY OF THE INVENTION

Thus, it is an aspect of the present invention to provide a server apparatus, a service method, a program and a recording medium, which are capable of solving the above-described problems. This aspect is achieved by combining features described in independent claims. Moreover, dependent claims define further advantageous concrete examples of the present invention.

Accordingly, the present invention provides: a server apparatus, for each of a plurality of elements, for receiving a processing request message including a structured document in which a name of the element and a content thereof are described, performing processing based on the processing request message, and returning a processing response message; a service method regarding the server apparatus; a program; and a recording medium. Specifically, the server apparatus includes: a request processing unit for performing processing based on the contents of the plurality of elements included in the first processing request message received, and creating the first processing response message; a cache unit for caching the first processing response message in association with a first key created based on a content of at least one predetermined key element among the plurality of elements included in the first processing request message; a message analysis unit for analyzing the second processing request message received, and sequentially extracting the contents of the plurality of elements; a key creation unit for creating a second key based on the content of the key element among the plurality of elements included in the second processing request message; and a cache management unit for returning, as the processing response message for the second processing request message, the first processing response message cached in the cache unit when the second key coincides with the first key, and when the second key does not coincide with the first key, notifying the contents of the plurality of elements extracted by the message analysis unit to the request processing unit, allowing the request processing unit to perform the processing based on the contents of the plurality of elements and to create the second processing response message, and returning the second processing response message created.

Thus, according to the present invention, in a server apparatus which provides services to a client apparatus through a communication network, an efficient cache function can be provided.

BRIEF DESCRIPTION OF THE DRAWINGS

For a more complete understanding of the present invention and the advantages thereof, reference is now made to the following description taken in conjunction with the accompanying drawings.

FIG. 5 shows an example of a class definition of an input class 500 according to the embodiment of the present invention.

FIG. 6 shows an example of a class definition of an output class 600 according to the embodiment of the present invention.

DRAWING SYMBOLS

Figure 1:
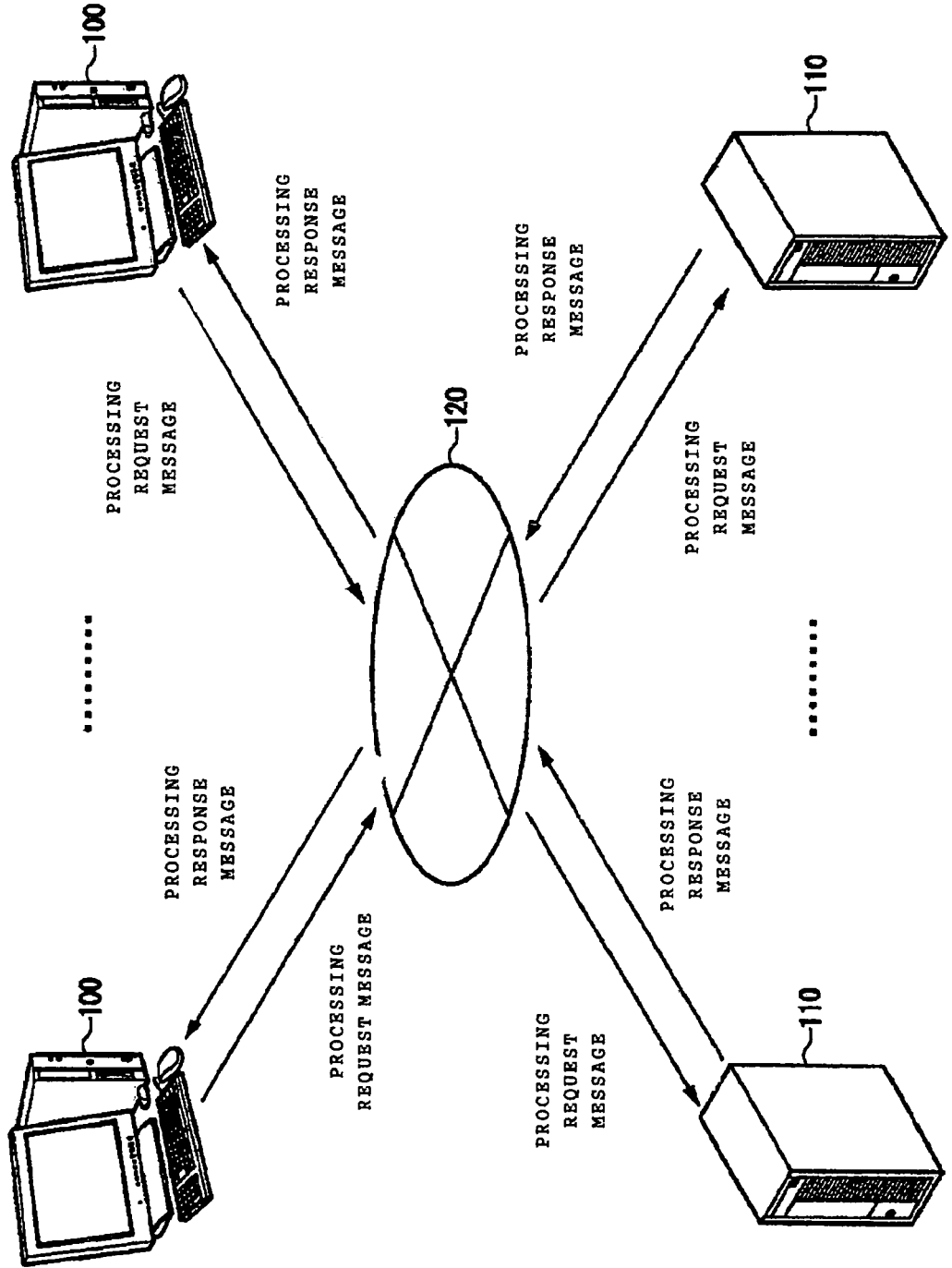
FIG. 1 shows a configuration of a web service system 10 according to an embodiment of the present invention.

FIG. 1
PROCESSING RESPONSE MESSAGE
PROCESSING REQUEST MESSAGE
PROCESSING REQUEST MESSAGE
PROCESSING RESPONSE MESSAGE
PROCESSING REQUEST MESSAGE
PROCESSING RESPONSE MESSAGE
PROCESSING RESPONSE MESSAGE
PROCESSING REQUEST MESSAGE

Figure 2:
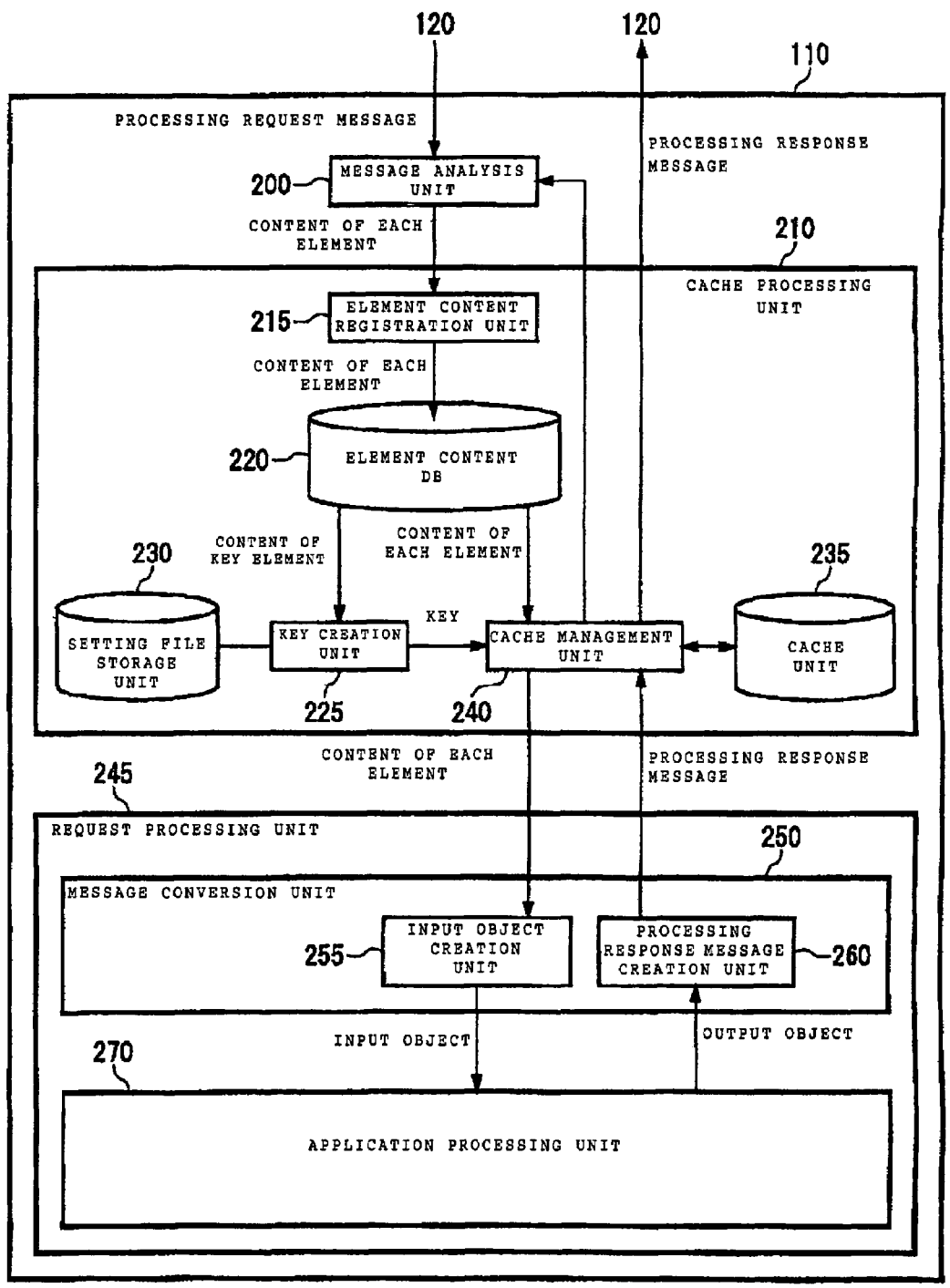
FIG. 2 shows a configuration of a server apparatus 100 according to the embodiment of the present invention.

FIG. 2
200 MESSAGE ANALYSIS UNIT
210 CACHE PROCESSING UNIT
215 ELEMENT CONTENT REGISTRATION UNIT
220 ELEMENT CONTENT DB
225 KEY CREATION UNIT
230 SETTING FILE STORAGE UNIT
235 CACHE UNIT
240 CACHE MANAGEMENT UNIT
245 REQUEST PROCESSING UNIT
250 MESSAGE CONVERSION UNIT
255 INPUT OBJECT CREATION UNIT
260 PROCESSING RESPONSE MESSAGE CREATION UNIT
270 APPLICATION PROCESSING UNIT
PROCESSING REQUEST MESSAGE
PROCESSING RESPONSE MESSAGE
CONTENT OF EACH ELEMENT
CONTENT OF EACH ELEMENT
CONTENT OF KEY ELEMENT
CONTENT OF EACH ELEMENT
KEY
CONTENT OF EACH ELEMENT
PROCESSING RESPONSE MESSAGE
INPUT OBJECT
OUTPUT OBJECT

Figure 3:
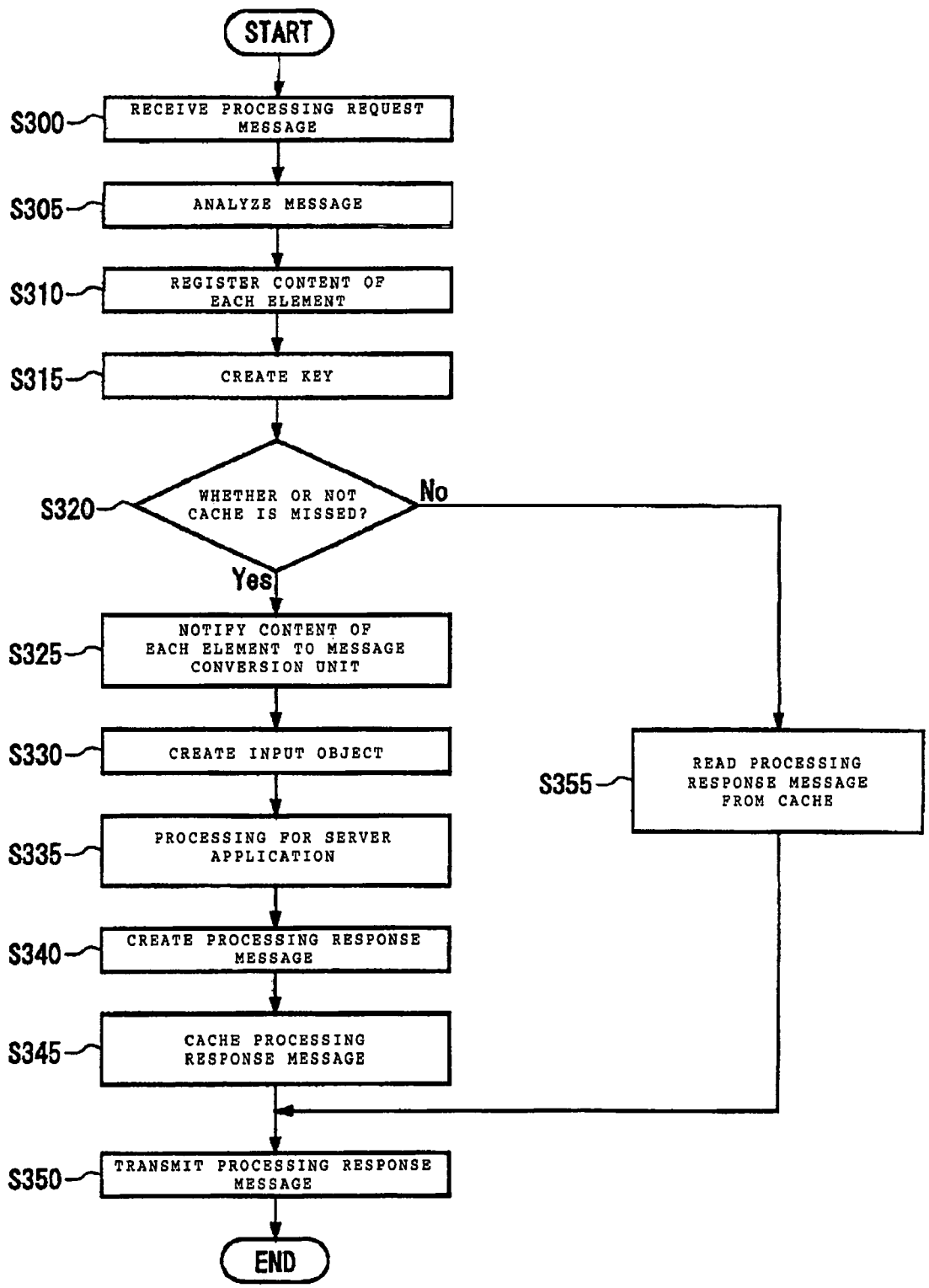
FIG. 3 shows a processing flow of the server apparatus 110 according to the embodiment of the present invention.

FIG. 3
S300 RECEIVE PROCESSING REQUEST MESSAGE
S305 ANALYZE MESSAGE
S310 REGISTER CONTENT OF EACH ELEMENT
S315 CREATE KEY
S320 WHETHER OR NOT CACHE IS MISSED?
S325 NOTIFY CONTENT OF EACH ELEMENT TO MESSAGE CONVERSION UNIT
S330 CREATE INPUT OBJECT
S335 PROCESSING FOR SERVER APPLICATION
S340 CREATE PROCESSING RESPONSE MESSAGE
S345 CACHE PROCESSING RESPONSE MESSAGE
S350 TRANSMIT PROCESSING RESPONSE MESSAGE
S355 READ PROCESSING RESPONSE MESSAGE FROM CACHE

Figure 4:
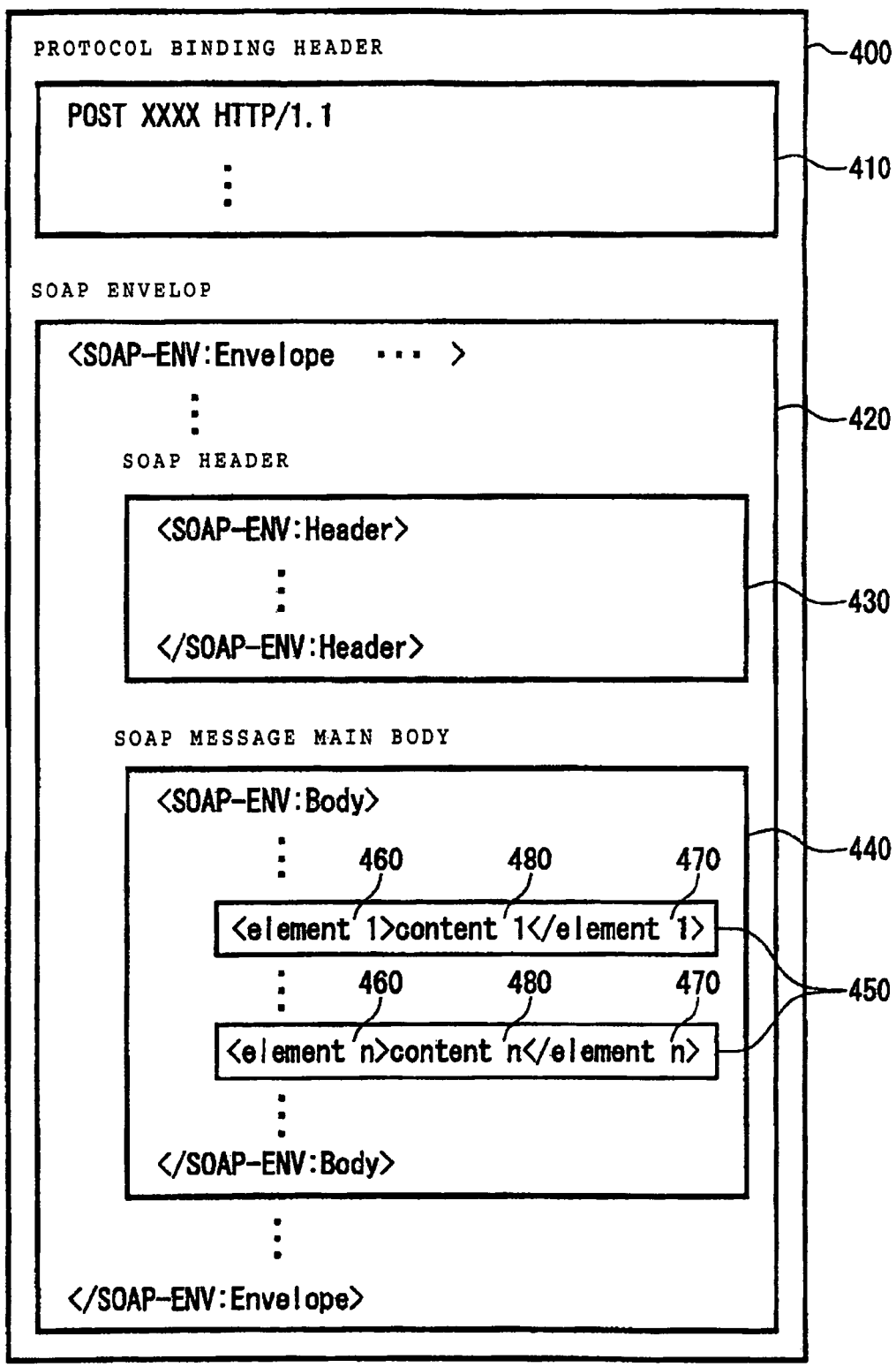
FIG. 4 shows an example of a processing request message 400 according to the embodiment of the present invention.

FIG. 4
410 PROTOCOL BINDING HEADER
420 SOAP ENVELOP
430 SOAP HEADER
440 SOAP MESSAGE MAIN BODY

Figure 7:
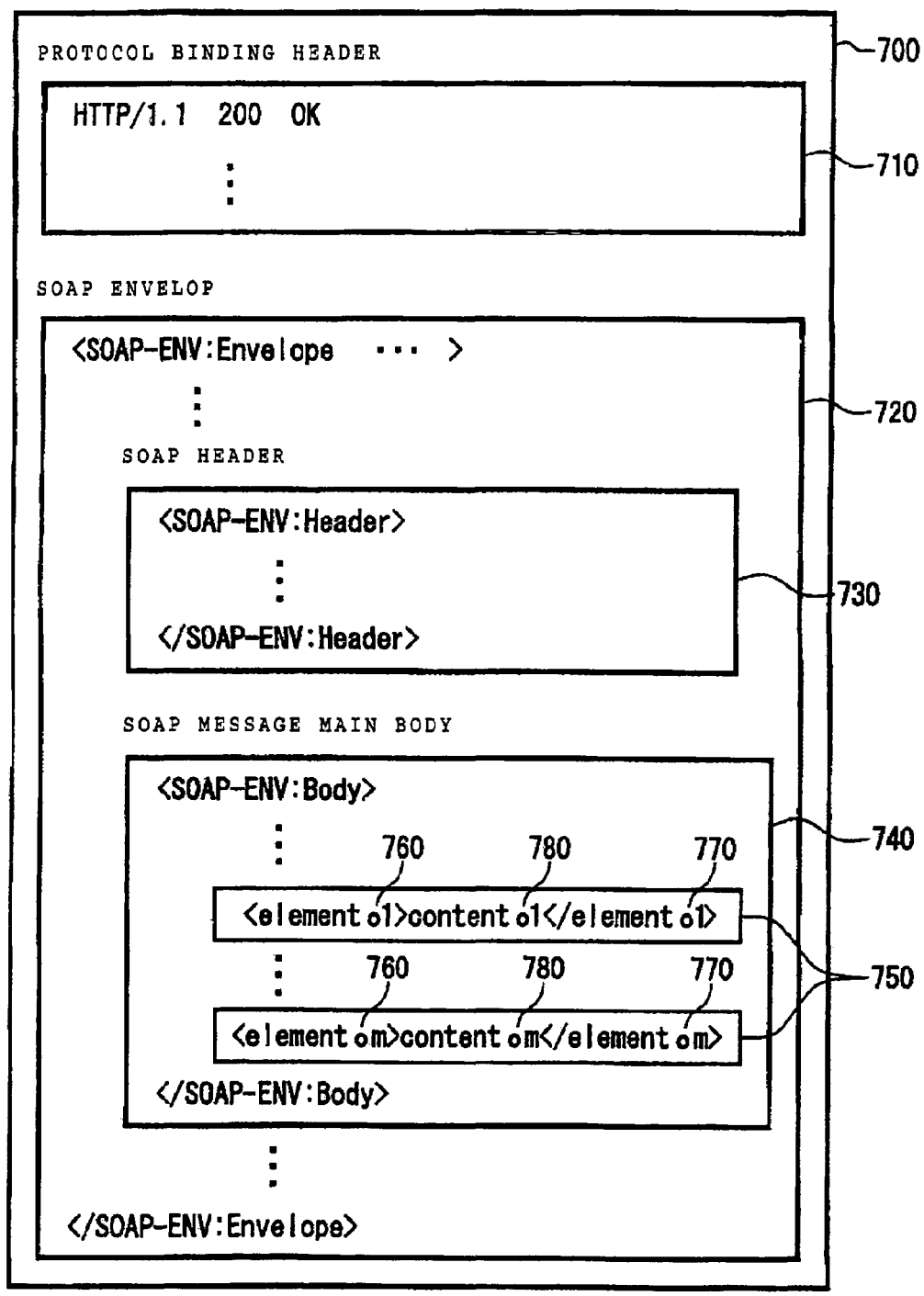
FIG. 7 shows an example of a processing response message 700 according to the embodiment of the present invention.

FIG. 7
710 PROTOCOL BINDING HEADER
720 SOAP ENVELOP
730 SOAP HEADER
740 SOAP MESSAGE MAIN BODY

Figure 8:
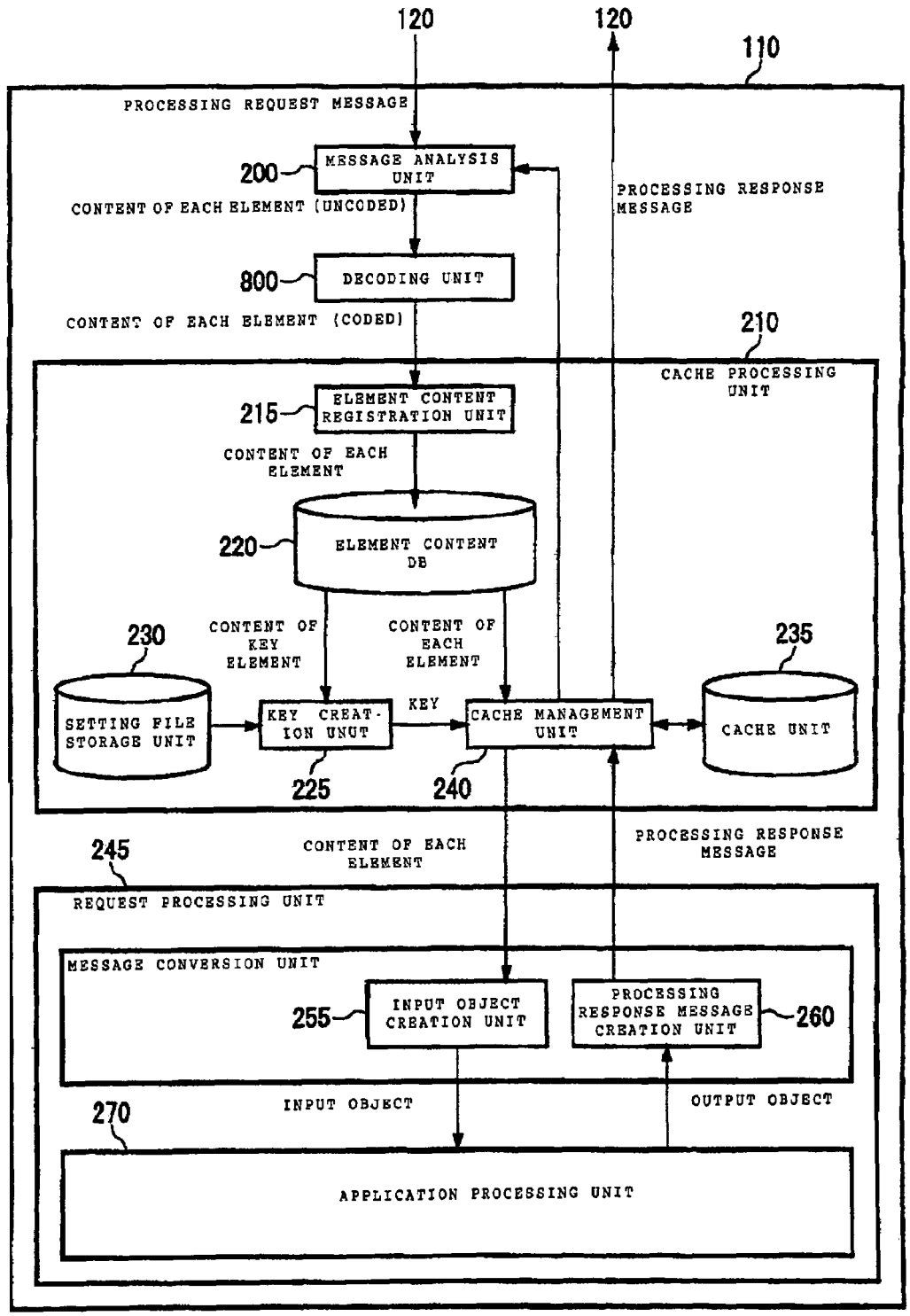
FIG. 8 shows a configuration of a server apparatus 110 according to a modified example of the embodiment of the present invention.

FIG. 8
200 MESSAGE ANALYSIS UNIT
210 CACHE PROCESSING UNIT
215 ELEMENT CONTENT REGISTRATION UNIT
220 ELEMENT CONTENT DB
225 KEY CREATION UNIT
230 SETTING FILE STORAGE UNIT
235 CACHE UNIT

240 CACHE MANAGEMENT UNIT
245 REQUEST PROCESSING UNIT
250 MESSAGE CONVERSION UNIT
255 INPUT OBJECT CREATION UNIT
260 PROCESSING RESPONSE MESSAGE CREATION UNIT
270 OBJECT PROCESSING UNIT
800 DECODING UNIT
PROCESSING REQUEST MESSAGE
PROCESSING RESPONSE MESSAGE
CONTENT OF EACH ELEMENT (UNCODED)
CONTENT OF EACH ELEMENT (CODED)
CONTENT OF EACH ELEMENT
CONTENT OF KEY ELEMENT
CONTENT OF EACH ELEMENT
KEY
CONTENT OF EACH ELEMENT
PROCESSING RESPONSE MESSAGE
INPUT OBJECT
OUTPUT OBJECT

Figure 9:
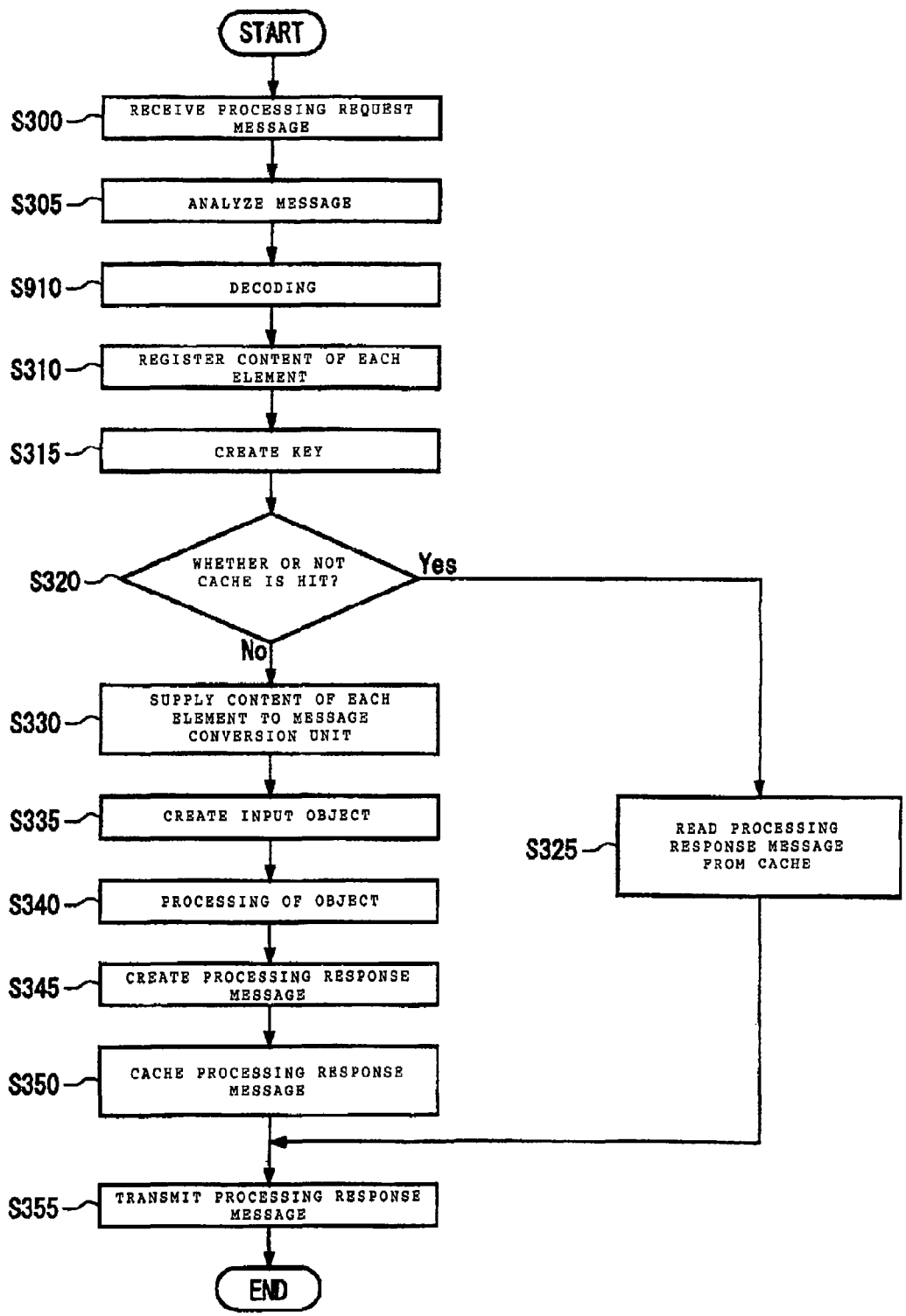
FIG. 9 shows a processing flow of the server apparatus 110 according to the modified example of the embodiment of the present invention.

FIG. 9
S300 RECEIVE PROCESSING REQUEST MESSAGE
S305 ANALYZE MESSAGE
S910 DECODING
S310 REGISTER CONTENT OF EACH ELEMENT
S315 CREATE KEY
S320 WHETHER OR NOT CACHE IS HIT?
S325 READ PROCESSING RESPONSE MESSAGE FROM CACHE
S330 SUPPLY CONTENT OF EACH ELEMENT TO MESSAGE CONVERSION UNIT
S335 CREATE INPUT OBJECT
S340 PROCESSING OF OBJECT
S345 CREATE PROCESSING RESPONSE MESSAGE
S350 CACHE PROCESSING RESPONSE MESSAGE
S355 TRANSMIT PROCESSING RESPONSE MESSAGE

Figure 10:
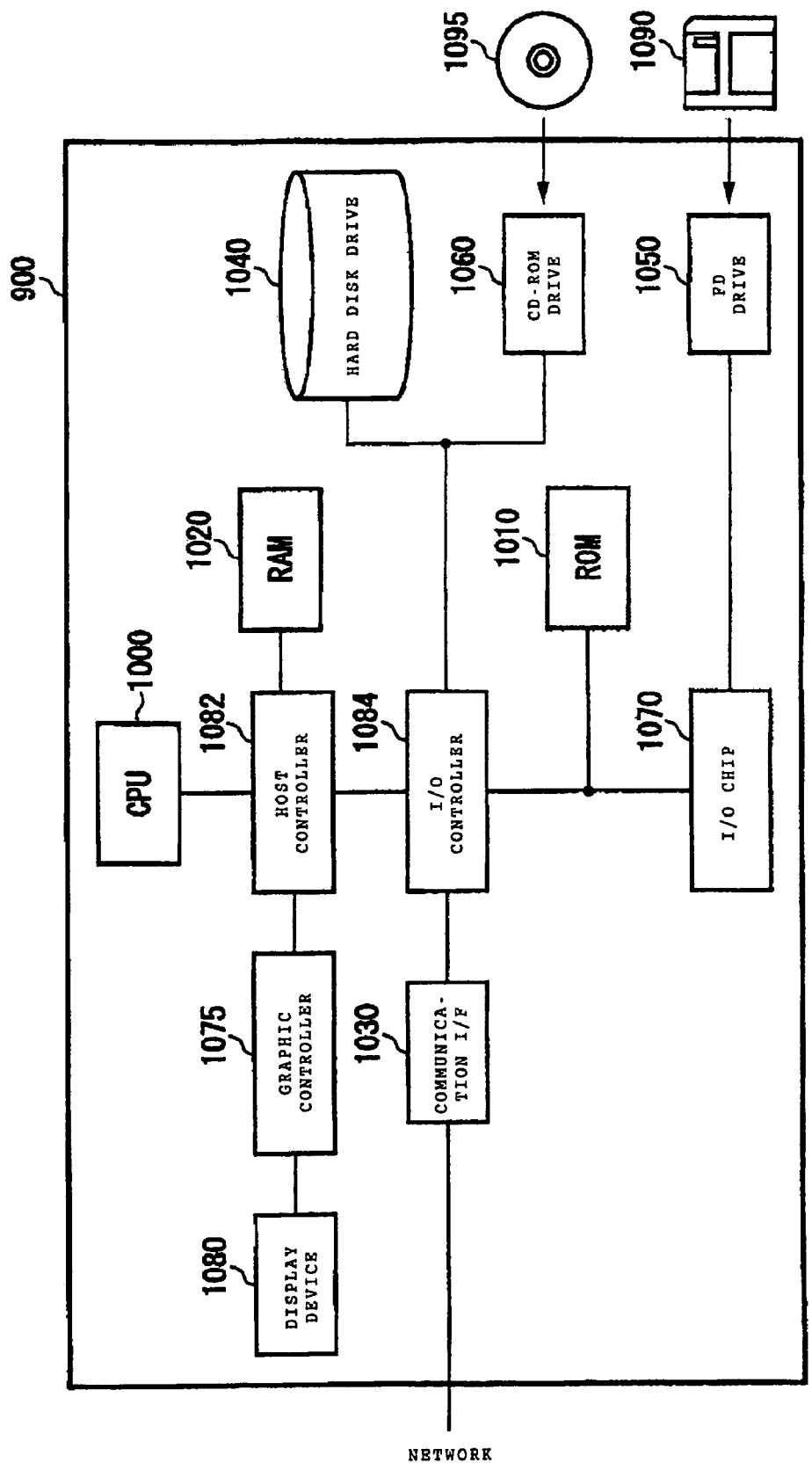
FIG. 10 shows a hardware configuration of a computer 900 according to the embodiment of the present invention.

FIG. 10
1030 COMMUNICATION I/F
1040 HARD DISK DRIVE
1050 FD DRIVE
1060 CD-ROM DRIVE
1070 I/O CHIP
1075 GRAPHIC CONTROLLER
1080 DISPLAY DEVICE
1082 HOST CONTROLLER
1084 I/O CONTROLLER
NETWORK

DETAILED DESCRIPTION OF THE INVENTION

The present invention provides methods, server apparatus, program and a recording medium, which are capable of solving the above-described problems. According to the present invention a server apparatus, for each of a plurality of elements, for receiving a processing request message including a structured document in which a name of the element and a content thereof are described, performing processing based on the processing request message, and returning a processing response message. An example embodiment of a server apparatus includes: a request processing unit for performing processing based on the contents of the plurality of elements included in the first processing request message received, and creating the first processing response message; a cache unit for caching the first processing response message in association with a first key created based on a content of at least one predetermined key element among the plurality of elements included in the first processing request message; a message analysis unit for analyzing the second processing request message received, and sequentially extracting the contents of the plurality of elements; a key creation unit for creating a second key based on the content of the key element among the plurality of elements included in the second processing request message; and a cache management unit for returning, as the processing response message for the second processing request message, the first processing response message cached in the cache unit when the second key coincides with the first key, and when the second key does not coincide with the first key, notifying the contents of the plurality of elements extracted by the message analysis unit to the request processing unit, allowing the request processing unit to perform the processing based on the contents of the plurality of elements and to create the second processing response message, and returning the second processing response message created.

Thus, according to the present invention, in a server apparatus which provides services to a client apparatus through a communication network, an efficient cache function can be provided.

The present invention will be described below according to an example embodiment. However, the invention according to the scope of claims is not limited by the following embodiment. Moreover, all combinations of features described in the embodiment are not always required for the solving means of the present invention.

FIG. 1 shows a configuration of a Web service system 10 according to this embodiment. The Web service system 10 includes: one or a plurality of client apparatuses 100 for executing application programs on clients based on instructions of users; one or a plurality of server apparatuses 110 for executing application programs on servers of Web services and the like; and a communication network 120, such as an Internet and an intranet, for connecting the client apparatuses 100 and the server apparatuses 110 to each other.

Each of the client apparatuses 100 performs processing specified by a user of the client apparatus 100 by combining services provided by a client application executed on the client apparatus 100 and one or a plurality of server applications executed on one or the plurality of server apparatus 110. To be more specific, the client apparatus 100 transmits a processing request message to the server apparatus 110 through the communication network 120 and requires the server apparatus 110 to perform processing for the services based on the processing request message. Thereafter, the client apparatus 100 receives, through the communication network 120, the processing response message transmitted by the server apparatus 110 which has performed the processing for the services, and obtains a result of the processing performed by the server apparatus 110.

Each of the server apparatuses 110 receives the processing request message from the client apparatus 100 through the communication network 120, performs the processing for the services based on the processing request message and returns the processing response message including the processing result. Here, the processing request message and the processing response message include structured documents, such as XML documents, in which, for each of a plurality of elements, a name of the element and a content thereof are described. The above-described messages are, for example, SOAP messages.

FIG. 2 shows a configuration of the server apparatus 110 according to this embodiment. The server apparatus 110 includes a message analysis unit 200, a cache processing unit 210 and a request processing unit 245. The cache processing unit 210 performs caching by utilizing a result of an analysis by the message analysis unit 200. Thus, the server apparatus 110 can have the same response time at the time of a cache hit as that of the cache method of Patent Document 1. Meanwhile, unnecessary syntax analyses are not performed, thus making it possible to shorten response time at the time of a cache miss as compared with that of the cache method of Patent Document 1.

The message analysis unit 200 is an example of a streaming syntax analyzer such as a SAX (Simple API for XML), for example. The message analysis unit 200 analyzes a processing request message received and sequentially extracts contents of a plurality of elements included in the processing request message.

The cache processing unit 210 caches a processing response message by using, as a key, a content of at least one element among the plurality of elements extracted by the message analysis unit 200. The cache processing unit 210 includes an element content registration unit 215, an element content database (element content DB) 220, a key creation unit 225, a setting file storage unit 230, a cache unit 235 and a cache management unit 240.

The element content registration unit 215 registers the respective contents of the plurality of elements, which are extracted by the message analysis unit 200, in the element content DB 220. The element content DB 220 is a buffer for temporarily retaining the respective contents of the plurality of elements registered by the element content registration unit 215. The key creation unit 225 creates a key of the processing request message based on a content of a key element, which is predetermined by a setting file stored in the setting file storage unit 230, among the plurality of elements retained in the element content DB 220. The cache unit 235 caches the already returned processing response message corresponding to the processing request message, in association with the key of the processing request message.

The cache management unit 240 judges that the cache is hit if a key which coincides with a key of a newly received processing request message is stored in the cache unit 235. Then, the cache management unit 240 returns a processing response message cached by the cache unit 235 in association with the key, to the server apparatus 110 which is the requester. Meanwhile, the cache management unit 240 judges that the cache is missed if the key which coincides with the key of the newly received processing request message is stored in the cache unit 235. Accordingly, the cache management unit 240 notifies the respective contents of the plurality of elements retained in the element content DB 220 to the request processing unit 245.

The request processing unit 245 performs processing for the Web services by using, as inputs, the contents of the plurality of elements included in the processing request message. The request processing unit 245 includes a message conversion unit 250 and an application processing unit 270. The message conversion unit 250 includes an input object creation unit 255 and a processing response message creation unit 260. Based on the contents of the plurality of elements received from the cache processing unit 210, the input object creation unit 255 creates an input object including parameters to be given to the server application for performing the processing for the Web services and supplies the input object to the application processing unit 270. The processing response message creation unit 260 receives an output object outputted as a result of the processing for the server application by the application processing unit 270, converts the output object into a processing response message, and outputs the message to the server apparatus 110 through the cache processing unit 210.

The application processing unit 270 performs the processing for the server application based on the input object inputted from the message conversion unit 250 and returns a result of the processing, as the output object, to the message conversion unit 250.

In this embodiment, the server apparatus 110 described above is realized by executing, on one or a plurality of server computers, a middleware program for providing the Web services and a server application program executed on the middleware.

FIG. 3 shows a processing flow of the server apparatus 110 according to this embodiment.

First, when a processing request message transmitted by the client apparatus 100 is received (S300), the message analysis unit 200 analyzes the processing request message, sequentially extracts contents of a plurality of elements included in the processing request message and notifies the contents to the cache processing unit 210 (S305). To be more specific, the message analysis unit 200 notifies the contents of the respective elements to the cache processing unit 210 by performing a syntax analysis of a structured document included in the processing request message and calling functions for realizing the element content registration unit 215 every time the respective contents of the plurality of elements are extracted.

Next, the element content registration unit 215 registers the respective contents of the plurality of elements, which are notified by the function call from the message analysis unit 200, in the element content DB 220 (S310). To be more specific, the element content registration unit 215 registers, in the element content DB220, the respective contents of the plurality of elements which are called by the function call from the message analysis unit 200 every time the respective contents of the plurality of elements are extracted, and notified by the function call.

Next, the key creation unit 225 creates a key of the processing request message based on a content of a key element among the plurality of elements included in the processing request message (S315).

To be more specific, for each of many kinds of processing request messages which may be received by the server apparatus 110, a manager of services provided by the server apparatus 110 prepares previously a setting file which specifies the key element for the processing request message. Here, the kind of the processing request message is determined based on a command requested to the Web service by the processing request message, for example, and the like. When processing response messages having the same contents can be returned for a plurality of processing request messages of the same kind, the manager of the services specifies key elements beforehand so that these processing request messages have the same keys.

The setting file storage unit 230 stores the setting file prepared by the manager. When it is detected that a processing request message is newly received, the key creation unit 225 judges the kind of the processing request message based on contents of elements included in the processing request message, and the like. Thereafter, the key creation unit 225 reads a key element for the processing request message from the setting file stored in the setting file storage unit 230 and creates a key of the processing request message based on contents of the key element. For example, the key creation unit 225 creates the key by means for converting the contents of the key element by use of hash functions, and the like.

As described above, the key creation unit 225 determines the key element based on the setting file previously stored in the setting file storage unit 230 by the manager of the services.

Thus, the key element can be properly selected in accordance with the kind of the processing request message. Here, if the kind of the processing request message is included as a name or a content of a certain element in the processing request message, the manager of the services may include the element in the key element. If the key element is determined under the condition described above, a different key is created in accordance with the kind of the processing request message. Thus, the key creation unit 225 does not have to previously judge the kind of the processing request message.

Moreover, when only a part of the plurality of elements is used as the key element, the key creation unit 225 first obtains the key element for the processing request message from the setting file. Thereafter, when all the key elements obtained from the setting file are registered in the element content DB 220, the key creation unit 225 creates keys based on contents of all the key elements registered in the element content DB 220. Thus, even in a state where elements other than the key elements are not registered in the element content DB 220, the key creation unit 225 and the cache management unit 240 can perform in advance creation of the keys and determination of the cash hit/miss.

Next, the cache management unit 240 searches through the cache unit 235 by use of the key and determines whether or not a key which coincides with the key is registered in the cache unit 235. If all the keys already registered in the cache unit 235 in association with the processing response message do not coincide with the key (S320: Yes), the cache management unit 240 notifies, to the request processing unit 245, the contents of the plurality of elements included in the processing request message, which are extracted by the message analysis unit 200 and stored in the element content DB 220 (S325). Thus, the cache management unit 240 allows the request processing unit 245 to perform processing based on the contents of the plurality of elements and to create a processing response message for the processing request message.

Here, the cache management unit 240 may notify all at once, to the request processing unit 245, all the contents of the plurality of elements registered in the element content DB 220, under further conditions that the analysis of the processing request message by the message analysis unit 200 is completed and all the contents of the plurality of elements are registered in the element content DB 220. Thus, the notification can be performed more efficiently than the case where the respective contents of the plurality of elements are sequentially notified to the request processing unit 245.

Next, the input object creation unit 255 creates an input object to be inputted to the application processing unit 270 in association with the processing request message, based on the contents of the plurality of elements notified by the cache management unit 240 (S330). Here, the input object means, for example, an object of Java (trademark) and the like, which is an object including input parameters of processing functions for performing processing corresponding to the processing request message, in the server application which allows the server computer to function as the application processing unit 270.

Next, the application processing unit 270 receives the input object, performs processing for the Web services and the like, which is determined by the processing functions, and creates an output object (S335). Here, the output object means, for example, an object of Java (trademark) and the like, which is an object including output parameters of processing functions.

Next, the processing response message creation unit 260 receives the output object from the application processing unit 270 and creates a processing response message, which corresponds to the processing request message, based on the output object (S340). Next, the cache management unit 240 receives the processing response message created by the processing response message creation unit 260 and allows the cache unit 235 to cache the processing response message created by the request processing unit 245 in association with the key created by the key creation unit 225 (S345). Thereafter, the cache management unit 240 returns the processing response message created by the request processing unit 245 (S350).

By the above-described processing, when a first processing request message is received from the client apparatus 100, a first processing response message corresponding to the first processing request message is cached by the cache unit 235 in association with a first key for the first processing request message.

Moreover, in S320, if the above-described key coincides with a key of any of the processing request messages already registered in the cache unit 235 in association with the processing response message (S320: No), the cache management unit 240 reads, as a processing response message for the processing request message, the processing response message cached by the cache unit 235 in association with the key which coincides with the above-described key (S355) and returns the processing response message to the client apparatus 100 (S350). Thus, in the case where the first processing request message is cached by the cache unit 235 in association with the first key, when a second key which is a key of a second processing request message coincides with the first key, the first processing response message cached by the cache unit 235 in association with the first key can be returned as a processing response message for the second processing request message.

Furthermore, in S320, if the above-described key coincides with the key of any of the processing request messages already registered in the cache unit 235 in association with the processing response message (S320: No), the cache management unit 240 may stop the processing of extracting the contents of the plurality of elements by the message analysis unit 200. Thus, it is possible to prevent the analysis of the processing request message from being uselessly continued at the time of the cache hit.

According to the server apparatus 110 described above, the cache processing unit 210 can perform caching by utilizing the result of the analysis of the processing request message by the message analysis unit 200. Here, also in Patent Document 1, the processing of creating the key by extracting the contents of the respective elements from the processing request message is required. Thus, the server apparatus 110 according to this embodiment can keep approximately the same response time at the time of the cache hit as that of Patent Document 1. Meanwhile, at the time of the cache miss, the server apparatus 110 according to this embodiment notifies the result of the analysis by the message analysis unit 200 to the request processing unit 245 in stead of transferring the processing request message to the request processing unit 245. Consequently, at the time of the cache miss, it is not required to perform the analysis of the processing request message again, thus making it possible to shorten the response time as compared with that of Patent Document 1.

Note that, if it is judged that the above-described key does not coincide with the key registered in the cache unit 235, in S325, every time the contents of the elements are notified by the function call from the message analysis unit 200 after the judgment described above, the element content registration unit 215 may directly notify the contents of the elements to the request processing unit 245 by the function call. Thus, after the cache miss is determined, the contents of the elements notified by the message analysis unit 200 can be efficiently sent to the request processing unit 245 without being passed through the element content DB 220 and the cache management unit 240.

FIG. 4 shows an example of a processing request message 400 according this embodiment. The processing request message 400 according to this embodiment is, for example, a SOAP message and includes: a protocol binding header 410 added in order to communicate the processing request message 400 through the communication network 120 by a protocol such as HTTP; and a SOAP envelop 420 including a main body of the processing request message 400.

The SOAP envelop 420 includes: a SOAP header 430 in which information sent between SOAP processing systems of the client apparatus 100 and the server apparatus 110 is described as XML documents; and a SOAP message main body 440 in which parameters to be sent to the request processing unit 245 are described as XML documents. Here, the SOAP message main body 440 includes a plurality of elements 450 which define the parameters to be sent to the request processing unit 245. Each of the elements 450 is defined by a group including: a start tag 460 which includes a name of the element 450 and indicates a start of a definition of the element 450; content data 480 in which contents of the element 450 is described; and an end tag 470 indicating an end of the definition of the element 450.

The message analysis unit 200 performs a syntax analysis from a top of the processing request message 400 in order. When a head tag and an end tag of the SOAP envelop 420 are detected, when a head tag and an end tag of the SOAP header 430 are detected, when a head tag and an end tag of the SOAP message main body 440 are detected, when the start tag 460 and the end tag 470 are detected and/or when the content data 480 is detected, the message analysis unit 200 notifies the above-described tags and data to the cache processing unit 210. To be more specific, the message analysis unit 200 notifies an event corresponding to the detected content, to the cache processing unit 210.

When an event to the effect that the end tag 470 is detected is notified, the element content registration unit 215 registers, in the element content DB 220, a group including a name of the element 450, which is notified when the start tag 460 is detected, and a content of the element 450, which is notified by the event.

FIG. 5 shows an example of an input class 500 according to this embodiment. When the respective contents of the plurality of elements are notified by the cache processing unit 210, the input object creation unit 255 creates an input object based on the input class 500 corresponding to the processing request message. Accordingly, the input object creation unit 255 assigns a content of an element corresponding to each of a plurality of variables in the input object, to the variable.

For example, when the processing request message includes "element 1" to "element n", the input object creation unit 255 instantiates the input class 500 including variables corresponding to "element 1" to "element n" according to the processing request message, and creates the input object. Next, the input object creation unit 255 assigns the content data 480 of the respective elements 450 in the processing request message, to the variables "element 1" to "element n", respectively. Thereafter, the input object creation unit 255 sends the input object, in which the content data 480 of the respective elements 450 are assigned, as a parameter to the application processing unit 270. Thus, the contents of the respective elements described in the processing request message are sent to the application processing unit 270.

The processing of converting the processing request message 400 into the input object can be divided into: processing of extracting the contents of the respective elements from the processing request message 400; and processing of creating an input object and assigning the contents of the respective elements to corresponding variables. The server apparatus 110 according to this embodiment performs caching by utilizing a result of the processing of extracting the contents of the respective elements from the processing request message 400 by the message analysis unit 200. In addition, the server apparatus 110 buffers the contents of the respective elements in the element content DB 220 and sends the contents to the request processing unit 245 at the time of the cache miss. Thus, in the server apparatus 110, there is no need to analyze the processing request message again at the time of the cache miss, and the response time can be shortened.

FIG. 6 shows an example of an output class 600 according to this embodiment. The application processing unit 270 performs processing for a server application such as the Web services, based on values of the respective variables included in the input object inputted from the input object creation unit 255. Next, the application processing unit 270 instantiates the output class 600 and creates an output object. Thereafter, the application processing unit 270 assigns return values to be returned to the client apparatus 100 which is the requestor, to respective variables of the output object, and sends the output object to the processing response message creation unit 260.

FIG. 7 shows an example of a processing response message 700 according to this embodiment. The processing response message 700 according to this embodiment is a SOAP message, for example. A protocol binding header 710, a SOAP envelop 720, a SOAP header 730, a SOAP message main body 740, elements 750, start tags 760, end tags 770 and content data 780 have the same functions as those of the protocol binding header 410, the SOAP envelop 420, the SOAP header 430, the SOAP message main body 440, the elements 450, the start tags 460, the end tags 470 and the content data 480, except for the following points. Thus, description thereof will be omitted below, except for differences therebetween.

Upon receiving the output object from the application processing unit 270, the processing response message creation unit 260 converts names and values of the respective variables included in the output object into the start tags 760, the end tags 770 and the content data 780 in the elements 750, and creates the SOAP message main body 740 in the XML document format. Specifically, for example, the processing response message creation unit 260 performs an operation such as a conversion of the variable "element o1" of the output object into "value of element o1" or the like, and creates the SOAP message main body 740 in the XML document format. Accordingly, the processing response message creation unit 260 creates the processing response message by adding the protocol binding header 710, a frame of the SOAP envelop 720 and the SOAP header 730 to the SOAP message main body 740 created.

The cache management unit 240 caches the processing response message created by the processing response message creation unit 260. Here, when the output object is cached as in the case of Non-Patent Document 1, there arises a need to create the processing response message from the output object also at the time of the cache hit. On the other hand, the server apparatus 110 according to this embodiment can obtain the processing response message directly from the cache unit 235, thus making it possible to shorten the response time.

FIG. 8 shows a configuration of a server apparatus 110 according to a modified example of this embodiment. In the server apparatus 110 according to this embodiment, the parts denoted by the same reference numerals as those in FIG. 2 have the same functions and configurations as those of the corresponding parts in FIG. 2. Thus, description thereof will be omitted below, except for differences therebetween.

The server apparatus 110 according to this modified example further includes a decoding unit 800 between the message analysis unit 200 and the cache processing unit 210. When contents of one or a plurality of elements included in a processing request message are coded, the contents are decoded by the decoding unit 800. As the processing request message including the coded contents as described above, a SOAP message based on WS-Security (Web services Security) specifications disclosed in Non-Patent Document 2, for example, is adopted.

Thereafter, the cache processing unit 210 notifies the contents of the plurality of elements including the decoded contents of the elements, to the cache processing unit 210, and allows the cache processing unit 210 and the request processing unit 245 to perform the processing of their own.

FIG. 9 shows a processing flow of the server apparatus 110 according to the modified example of this embodiment.

First, the message analysis unit 200 in the server apparatus 110 receives a processing request message, in which a content of at least one of the elements is coded, as in the case of S300 of FIG. 3. Next, as in the case of S305, the message analysis unit 200 analyzes the processing request message and sequentially extracts contents of a plurality of elements included in the processing request message.

The decoding unit 800 receives the respective contents of the plurality of elements, which are extracted by the message analysis unit 200, and if the contents are coded, the decoding unit 800 decodes the contents (S910). Thereafter, the decoding unit 800 sequentially notifies the decoded contents of the plurality of elements, to the cache processing unit 210. To be more specific, every time the contents of the respective elements are notified by the message analysis unit 200, the decoding unit 800 decodes the contents if the contents are coded. Accordingly, the decoding unit 800 sequentially notifies the contents of the respective elements to the cache processing unit 210 by calling a function for realizing the element content registration unit 215 for each of the plurality of elements.

Here, upon decoding the contents of the elements, the decoding unit 800 may obtain groups including the start tags 460, the end tags 470 and the content data 480 for a plurality of elements defined as sub-elements of the elements. In this case, the decoding unit 800 sequentially notifies, to the cache processing unit 210, names and contents of the elements included in the decoded contents, in addition to the plurality of elements. Specifically, for example, if the processing request message includes "element 1" and "element 2" and "element 1" is decoded to obtain "element 1-1" and "element 1-2," the decoding unit 800 sequentially notifies contents of "element 1," "element 1-1," "element 1-2" and "element 2," to the cache processing unit 210.

Accordingly, the server apparatus 110 performs the processing shown in S310 to S355 in FIG. 3 for the plurality of elements to which the elements decoded by the decoding unit 800 are added.

In the server apparatus 110 according to this modified example, even in the case where at least one of the elements included in the processing request message is coded, the content of the element can be decoded to be a key and caching can be properly performed. Moreover, the cache processing unit 210 notifies the decoded contents of the plurality of elements, to the request processing unit 245. Thus, the contents of the elements decoded by the decoding unit 800 can be used in both of the cache processing unit 210 and the request processing unit 245. Consequently, caching can be efficiently performed.

FIG. 10 shows a hardware configuration of a computer 900 according to this embodiment. The computer 900 according to this embodiment includes: a CPU peripheral part having a CPU 1000, a RAM 1020, and a graphic controller 1075, all of which are connected to each other by a host controller 1082, and a display device 1080; an input/output part having a communication interface 1030, a hard disk drive 1040 and a CD-ROM drive 1060, all of which are connected to the host controller 1082 by an input/output controller 1084; and a legacy input/output part having a ROM 1010, a flexible disk drive 1050 and an input/output chip 1070, all of which are connected to the input/output controller 1084.

The host controller 1082 connects the RAM 1020, the CPU 1000 accessing the RAM 1020 at a high transfer rate and the graphic controller 1075 to each other. The CPU 1000 operates based on programs stored in the ROM 1010 and the RAM 1020, and controls the respective parts. The graphic controller 1075 obtains image data created on a frame buffer provided in the RAM 1020 by the CPU 1000 and the like, and displays the data on the display device 1080. Alternatively, the graphic controller 1075 may include a frame buffer which stores image data created by the CPU 1000 and the like therein.

The input/output controller 1084 connects the host controller 1082 to the communication interface 1030, the hard disk drive 1040 and the CD-ROM drive 1060, which are relatively high-speed input/output devices. The communication interface 1030 communicates with other devices through the network. The hard disk drive 1040 stores programs and data which are used by the CPU 1000 in the computer 900. The CD-ROM drive 1060 reads programs or data from the CD-ROM 1095 and provides the programs or the data to the hard disk drive 1040 through the RAM 1020.

Moreover, to the input/output controller 1084, the ROM 1010, the flexible disk drive 1050 and the input/output chip 1070 are connected, which are relatively low-speed input/output devices. The ROM 1010 stores a boot program executed by the computer 900 at its start, a program dependent on the hardware of the computer 900, and the like. The flexible disk drive 1050 reads programs or data from the flexible disk 1090 and provides the programs or the data to the hard disk drive 1040 through the RAM 1020. The input/output chip 1070 connects the various input/output devices to each other through the flexible disk drive 1050 and, for example, a parallel port, a serial port, a keyboard port, a mouse port and the like.

The programs provided to the hard disk drive 1040 through the RAM 1020 are stored in a recording medium such as the flexible disk 1090, the CD-ROM 1095, and an IC card. Thus, the programs are provided by a user. The programs are read from the recording medium, installed into the hard disk drive 1040 in the computer 900 through the RAM 1020, and executed in the CPU 1000.

A program which is installed into the computer 900 and allows the computer 900 to function as the server apparatus 110 includes a message analysis module, a cache processing module and a request processing module. Moreover, the program may further include a decoding module. The above-described program or modules work on the CPU 1000 and the like and allow the computer 900 to function as the message analysis unit 200, the cache processing unit 210, the request processing unit 245 and the decoding unit 800, respectively.

The cache processing module has an element content registration module, a key creation module and a cache management module. The above-described program or modules work on the CPU 1000 and the like and allow the computer 900 to function as the element content registration unit 215, the key creation unit 225 and the cache management unit 240, respectively.

The request processing module has a message conversion module including an input object creation module and a processing response message creation module, and an application processing module. The above-described program or modules work on the CPU 1000 and the like and allow the computer 900 to function as the message conversion unit 250 including the input object creation unit 255 and the processing response message creation unit 260, and the application processing unit 270, respectively.

The above-described program or modules may be stored in an external storage medium. As the storage medium, besides the flexible disk 1090 and the CD-ROM 1095, an optical recording medium such as a DVD and a PD, a magneto-optical recording medium such as a MD, a tape medium, a semiconductor memory such as an IC card, and the like can be used. Moreover, the program may be provided to the computer 900 through the network by using, as the recording medium, a storage device such as a hard disk or a RAM, which is provided in a server system connected to a dedicated communication network or the Internet.

The present invention has been described above by use of the embodiment. However, the technical range of the present invention is not limited to the range described in the foregoing embodiment. It is apparent to those skilled in the art that various changes or modifications can be added to the above-described embodiment. It is apparent from description of claims that embodiments having such changes or modifications added thereto can be also included in the technical range of the present invention.

According to the embodiment described above, a server apparatus, a service method, a program and a recording medium, all of which are described in the respective items below, are realized.

(Item 1) A server apparatus, for each of a plurality of elements, for receiving a processing request message including a structured document in which a name of the element and a content thereof are described, performing processing based on the processing request message, and returning a processing response message, the server apparatus including: a request processing unit for performing processing based on the contents of the plurality of elements included in the first processing request message received, and creating the first processing response message; a cache unit for caching the first processing response message in association with a first key created based on a content of at least one predetermined key element among the plurality of elements included in the first processing request message; a message analysis unit for analyzing the second processing request message received, and sequentially extracting the contents of the plurality of elements; a key creation unit for creating a second key based on the content of the key element among the plurality of elements included in the second processing request message; and a cache management unit for returning, as the processing response message for the second processing request message, the first processing response message cached in the cache unit when the second key coincides with the first key, and when the second key does not coincide with the first key, notifying the contents of the plurality of elements extracted by the message analysis unit to the request processing unit, allowing the request processing unit to perform the processing based on the contents of the plurality of elements and to create the second processing response message, and returning the second processing response message created.

(Item 2) The server apparatus according to item 1, wherein, when the second key does not coincide with the first key, the cache management unit allows the cache unit to cache, in association with the second key, the second processing response message created by the request processing unit.

(Item 3) The server apparatus according to item 1, wherein the request processing unit includes: an input object creation unit for creating an input object including input parameters of processing functions for performing processing corresponding to the processing request message, based on the contents of the plurality of elements; an application processing unit for receiving the input object, performing processing determined by the processing functions and creating an output object including output parameters of the processing functions; and a processing response message creation unit for creating the processing response message based on the output object.

(Item 4) The server apparatus according to item 1, further including a setting file storage unit for storing a setting file which specifies the key element for the processing request message for each of many kinds of the processing request messages, wherein the key creation unit creates the second key based on a content of the key element for the second processing request message.

(Item 5) The server apparatus according to item 1, further including an element content registration unit for registering the respective contents of the plurality of elements in an element content database, the contents being called by function call from the message analysis unit every time the respective contents of the plurality of elements included in the second processing request message are extracted and the contents being notified by the function call, wherein the key creation unit creates the second key based on contents of all the key elements registered in the element content database if all the key elements are registered in the element content database, and wherein the cache management unit notifies all the contents of the plurality of elements registered in the element content database to the request processing unit when all the contents of the plurality of elements are registered in the element content database and the second key does not coincide with the first key.

(Item 6) The server apparatus according to item 5, further including a setting file storage unit for storing a setting file which specifies the key element for the processing request message for each of many kinds of the processing request messages, wherein the key creation unit obtains the key element for the second processing request message from the setting file and creates the second key if all the key elements obtained from the setting file are registered in the element content database.

(Item 7) The server apparatus according to item 5, wherein, when it is judged that the second key does not coincide with the first key, every time the contents of the elements are notified by the function call from the message analysis unit after the judgment, the element content registration unit notifies the contents of the elements to the request processing unit by the function call.

(Item 8) The server apparatus according to item 1, wherein, when the second key coincides with the first key, the cache management unit stops extraction of the contents of the plurality of elements by the message analysis unit.

(Item 9) The server apparatus according to item 1, further including a decoding unit for receiving the respective contents of the plurality of elements extracted by the message analysis unit, decoding the contents if the contents are coded, and sequentially adding names and contents of elements included in the contents to the plurality of elements, wherein the key creation unit creates the second key based on the content of the key element among the plurality of elements which are included in the second processing request message and to which the elements decoded by the decoding unit are added.

(Item 10) A service method by a server apparatus, for each of a plurality of elements, for receiving a processing request message including a structured document in which a name of the element and a content thereof are described, performing processing based on the processing request message, and returning a processing response message, the method including: a request processing step of performing processing based on the contents of the plurality of elements included in the first processing request message received, and creating the first processing response message; a cache step of caching the first processing response message in association with a first key created based on a content of at least one predetermined key element among the plurality of elements included in the first processing request message; a message analysis step of analyzing the second processing request message received, and sequentially extracting the contents of the plurality of elements; a key creation step of creating a second key based on the content of the key element among the plurality of elements included in the second processing request message; and a cache management step of returning, as the processing response message for the second processing request message, the first processing response message cached in the cache step when the second key coincides with the first key, and when the second key does not coincide with the first key, notifying the contents of the plurality of elements extracted in the message analysis step to the request processing step, allowing the request processing step to perform the processing based on the contents of the plurality of elements and to create the second processing response message, and returning the second processing response message created.

(Item 11) A program for a server apparatus, for each of a plurality of elements, for receiving a processing request message including a structured document in which a name of the element and a content thereof are described, performing processing based on the processing request message, and returning a processing response message, the program allowing a computer operated as the server apparatus to function as: a request processing unit for performing processing based on the contents of the plurality of elements included in the first processing request message received, and creating the first processing response message; a cache unit for caching the first processing response message in association with a first key created based on a content of at least one predetermined key element among the plurality of elements included in the first processing request message; a message analysis unit for analyzing the second processing request message received, and sequentially extracting the contents of the plurality of elements; a key creation unit for creating a second key based on the content of the key element among the plurality of elements included in the second processing request message; and a cache management unit for returning, as the processing response message for the second processing request message, the first processing response message cached in the cache unit when the second key coincides with the first key, and when the second key does not coincide with the first key, notifying the contents of the plurality of elements extracted by the message analysis unit to the request processing unit, allowing the request processing unit to perform the processing based on the contents of the plurality of elements and to create the second processing response message, and returning the second processing response message created.

(Item 12) A computer-readable recording medium for recording the program according to item 11.

Although the preferred embodiment of the present invention has been described in detail, it should be understood that various changes, substitutions and alternations can be made therein without departing from spirit and scope of the inventions as defined by the appended claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Claim A1. An article of manufacture comprising a computer usable medium having computer readable program code means embodied therein for causing a [GENERAL DESCRIPTION OF FUNCTION], the computer readable program code means in said article of manufacture comprising computer readable program code means for causing a computer to effect the steps of claim ??????.

Claim B1. A program storage device readable by machine, tangibly embodying a program of instructions executable by the machine to perform method steps for [DESCRIPTION OF GENERAL FUNCTION], said method steps comprising the steps of claim ?????.

Claim C1. A computer program product comprising a computer usable medium having computer readable program code means embodied therein for causing a [GENERAL DESCRIPTION OF FUNCTION], the computer readable program code means in said computer program product comprising computer readable program code means for causing a computer to effect the functions of claim ???????.

What is claimed is:

1. A server apparatus comprising:
   a request processing unit embedded in a physical and tangible computer medium, said apparatus for each of a plurality of elements, for receiving processing request messages that include a structured document in which a name of an element and a content thereof are described, performing processing based on the processing request messages, and returning processing response messages, said request processing unit for performing processing based on contents of the plurality of elements included in a first processing request message received, and creating a first processing response message;
   a cache unit for caching the first processing response message in association with a first key created based on a content of at least one predetermined key element among the plurality of elements included in the first processing request message;
   a message analysis unit for analyzing the second processing request message received, and sequentially extracting the contents of the plurality of elements;
   a key creation unit for creating a second key based on the content of the key element among the plurality of elements included in the second processing request message; and
   a cache management unit for returning, as the processing response message for the second processing request message, the first processing response message cached in the cache unit when the second key coincides with the first key, and when the second key does not coincide with the first key, notifying the contents of the plurality of elements extracted by the message analysis unit to the request processing unit, allowing the request processing unit to perform the processing based on the contents of the plurality of elements and to create the second processing response message, and returning the second processing response message created;
   wherein said apparatus comprises a capability to selectively implement a combination of limitations taken from a group of limitations consisting of:
   when the second key does not coincide with the first key, the cache management unit allows the cache unit to cache, in association with the second key, the second processing response message created by the request processing unit;
   the request processing unit comprising:
     an input object creation unit for creating an input object including input parameters of processing functions for performing processing corresponding to the processing request message, based on the contents of the plurality of elements,
     an application processing unit for receiving the input object, performing processing determined by the processing functions and creating an output object including output parameters of the processing functions, and
     a processing response message creation unit for creating the processing response message based on the output object; and
   further comprising:
     a setting file storage unit for storing a setting file which specifies the key element for the processing request message for each of many kinds of the processing request messages,
     wherein the key creation unit creates the second key based on a content of the key element for the second processing request message, and
     an element content registration unit for registering the respective contents of the plurality of elements in an element content database, the contents being called by function call from the message analysis unit every time the respective contents of the plurality of elements included in the second processing request message are extracted and the contents being notified by the function call,
     wherein the key creation unit creates the second key based on contents of all the key elements registered in the element content database if all the key elements are registered in the element content database, and
     wherein the cache management unit notifies all the contents of the plurality of elements registered in the element content database to the request processing unit when all the contents of the plurality of elements are registered in the element content database and the second key does not coincide with the first key;
   further comprising a setting file storage unit for storing a setting file which specifies the key element for the processing request message for each of many kinds of the processing request messages, wherein the key creation unit obtains the key element for the second processing request message from the setting file and creates the second key if all the key elements obtained from the setting file are registered in the element content database; and when it is judged that the second key does not coincide with the first key, every time the contents of the elements are notified by the function call from the message analysis unit after the judgment, the element content registration unit notifies the contents of the elements to the request processing unit by the function call;

when the second key coincides with the first key, the cache management unit stops extraction of the contents of the plurality of elements by the message analysis unit; and further comprising:

a decoding unit for receiving the respective contents of the plurality of elements extracted by the message analysis unit, decoding the contents if the contents are coded, and sequentially adding names and contents of elements included in the contents to the plurality of elements, wherein the key creation unit creates the second key based on the content of the key element among the plurality of elements which are included in the second processing request message and to which the elements decoded by the decoding unit are added.

* * * * *